US012573969B2

(12) United States Patent
Xu et al.

(10) Patent No.: US 12,573,969 B2
(45) Date of Patent: Mar. 10, 2026

(54) ALTERNATING CURRENT POWER TOOL AND STARTUP METHOD THEREOF

(71) Applicant: Nanjing Chervon Industry Co., Ltd., Nanjing (CN)

(72) Inventors: Tianxiao Xu, Nanjing (CN); Jifeng Feng, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 174 days.

(21) Appl. No.: 17/586,485

(22) Filed: Jan. 27, 2022

(65) Prior Publication Data

US 2022/0149760 A1 May 12, 2022

Related U.S. Application Data

(63) Continuation of application No. PCT/CN2019/101690, filed on Aug. 21, 2019.

(51) Int. Cl.
*H02P 6/16* (2016.01)
*B24B 23/02* (2006.01)
(Continued)

(52) U.S. Cl.
CPC ................ *H02P 6/16* (2013.01); *B24B 23/02* (2013.01); *B25F 5/00* (2013.01); *H02M 1/083* (2013.01);
(Continued)

(58) Field of Classification Search
CPC ...... H02M 7/5395; H02M 1/36; H02M 1/007; H02M 7/53871; H02M 7/5387;
(Continued)

(56) References Cited

U.S. PATENT DOCUMENTS 6,528,967 B2    3/2003   Hallidy
8,288,975 B2    10/2012  Mullin et al.
(Continued)

FOREIGN PATENT DOCUMENTS

CN        1864320 A     11/2006
CN      103248294 B      9/2015
(Continued)

OTHER PUBLICATIONS

ISA/CN, International Search Report issued on PCT application No. PCT/CN2019/101690, dated May 14, 2020, 4 pages.
(Continued)

*Primary Examiner* — Said Bouziane
(74) *Attorney, Agent, or Firm* — Greenberg Traurig, LLP

(57) ABSTRACT

An alternating current power tool includes a brushless motor, a power module, a voltage conversion module, a drive circuit, and a controller. The power module is configured to receive an alternating current to supply power to the stator winding. The voltage conversion module is configured to receive the alternating current received by the power module and operatively output a direct current bus voltage. The drive circuit is electrically connected to the voltage conversion module and configured to drive the brushless motor. The controller is configured to start timing when the alternating current received by the power module crosses through a point of zero. In a preset time interval [T1, T2] of each half cycle, a first control signal is outputted to the drive circuit to power on the stator winding.

20 Claims, 7 Drawing Sheets

(51) Int. Cl.

| | | |
|---|---|---|
| *B25F 5/00* | (2006.01) |
| *H02M 1/08* | (2006.01) |
| *H02M 1/36* | (2007.01) |
| *H02M 7/5387* | (2007.01) |
| *H02P 6/08* | (2016.01) |

(52) U.S. Cl.
CPC ......... *H02M 1/36* (2013.01); *H02M 7/53871*
(2013.01); *H02P 6/08* (2013.01)

(58) Field of Classification Search
CPC .. H02M 1/083; H02P 6/08; H02P 1/04; H02P
6/10; H02P 6/085; H02P 6/16; B25F
5/00; B24B 23/02
See application file for complete search history.

(56) References Cited

U.S. PATENT DOCUMENTS

| | | | |
|---|---|---|---|
| 9,621,081 B2 | 4/2017 | Kawai et al. | |
| 2006/0001392 A1 | 1/2006 | Ajima et al. | |
| 2018/0290270 A1* | 10/2018 | Manasseh | H02P 6/32 |
| 2018/0331648 A1 | 11/2018 | Iwata et al. | |
| 2018/0367073 A1* | 12/2018 | Haas | B62D 5/0487 |

FOREIGN PATENT DOCUMENTS

| | | |
|---|---|---|
| CN | 108233697 A | 6/2018 |
| CN | 208961121 U | 6/2019 |

OTHER PUBLICATIONS

ISA/CN, English translation of International Search Report issued on PCT application No. PCT/CN2019/101690, dated May 14, 2020, 2 pages.

ISA/CN, Written Opinion issued on PCT application No. PCT/CN2019/101690, dated May 14, 2020, 3 pages.

ISA/CN, English translation of Written Opinion issued on PCT application No. PCT/CN2019/101690, dated May 14, 2020, 3 pages.

EPO, examination report issued on European patent application No. 19942221.3, dated Mar. 22, 2023, 8 pages.

EPO, extended European Search Report issued on European publication No. 4020786A1, dated Jul. 25, 2022, 10 pages.

* cited by examiner

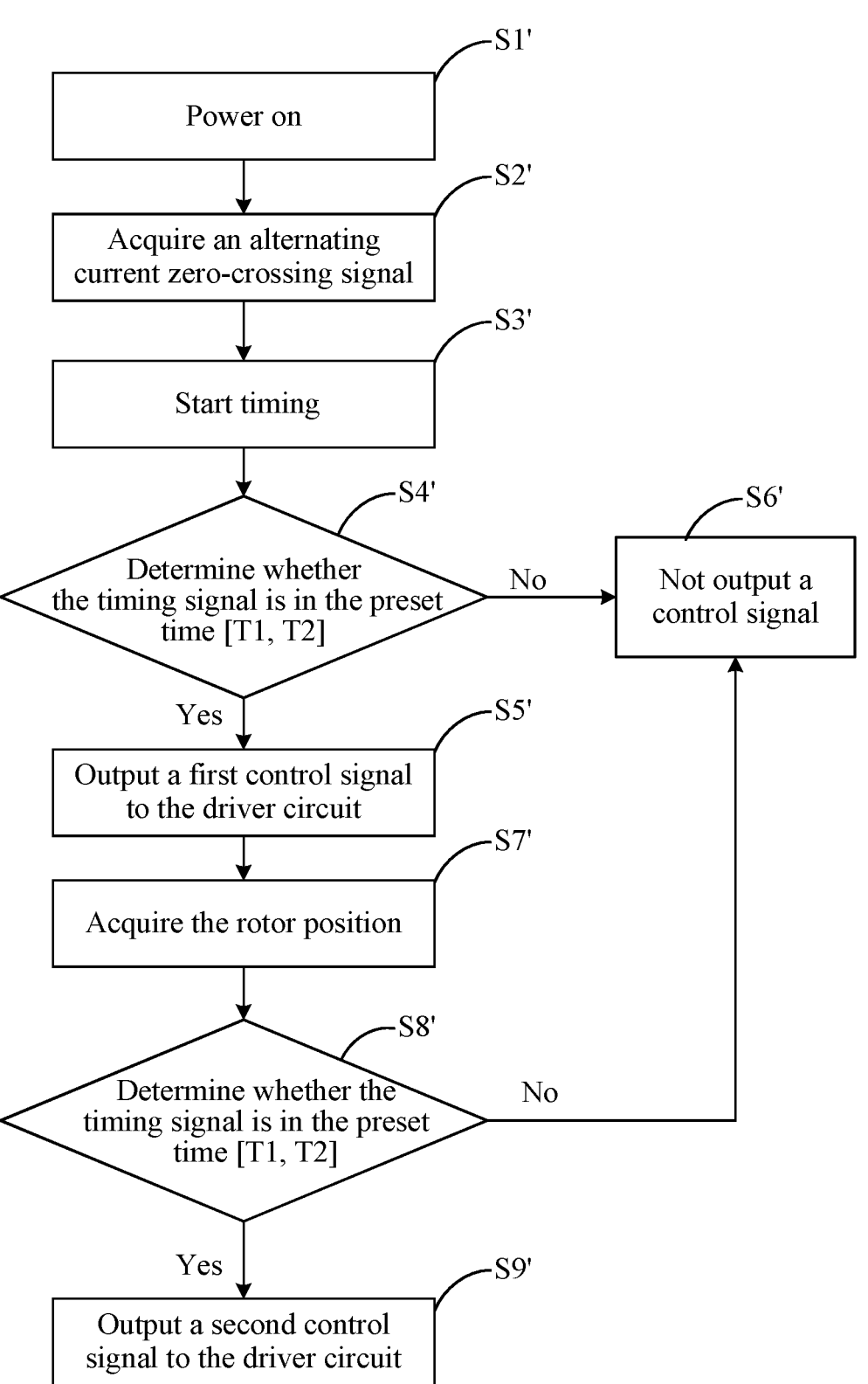

S1'
Power on

S2'
Acquire an alternating
current zero-crossing signal

S3'
Start timing

S4'
Determine whether
the timing signal is in the preset
time [T1, T2]

No

S6'
Not output a
control signal

Yes

S5'
Output a first control signal
to the driver circuit

S7'
Acquire the rotor position

S8'
Determine whether the
timing signal is in the preset
time [T1, T2]

No

Yes

S9'
Output a second control
signal to the driver circuit

FIG. 10

ALTERNATING CURRENT POWER TOOL AND STARTUP METHOD THEREOF

RELATED APPLICATION INFORMATION

This application is a continuation of International Application Number PCT/CN2019/101690, filed on Aug. 21, 2019, which application is incorporated herein by reference in its entirety.

BACKGROUND

In the related art, a power tool powered by an alternating current typically employs a large electrolytic capacitor to stabilize an input voltage. On the one hand, due to the large size of the large electrolytic capacitor, the overall structure of the power tool is relatively large so that the assembly of the overall power tools is affected. On the other hand, when the power tool is working, the large electrolytic capacitor is continuously charged and discharged so that the electrolytic capacitor generates a large amount of heat, resulting in a short life of the electrolytic capacitor, and also affecting the heat dissipation performance of the power tool. However, if no large electrolytic capacitor is used, the voltage input to the motor produces a large pulsation, and when the power tool is started up, there is a high probability of startup failure.

SUMMARY

An alternating current power tool includes a brushless motor, a power module, a voltage conversion module, a drive circuit, and a controller. The brushless motor includes a stator winding and a rotor. The power module is configured to receive an alternating current to supply power to the stator winding. The voltage conversion module is configured to receive the alternating current received by the power module and operatively output a direct current bus voltage. The drive circuit is electrically connected to the power conversion module and configured to drive the brushless motor. The controller is configured to start timing when the alternating current received by the power module crosses through a point of zero; and in a preset time interval [T1, T2] of each half cycle, output a first control signal to the drive circuit to power on the stator winding. The starting time of the preset time interval is T1, and the cut-off time of the preset time interval is T2.

An alternating current power tool includes a brushless motor, a power module, a voltage conversion module, a drive circuit, and a controller. The brushless motor includes a stator winding and a rotor. The power module is configured to receive an alternating current to supply power to the stator winding. The voltage conversion module is configured to receive the alternating current received by the power module and operatively output a direct current bus voltage. The drive circuit is electrically connected to the power conversion module and configured to drive the brushless motor. In a case where an instantaneous voltage value of the alternating current is greater than or equal to a preset voltage value V0 of the alternating current in each half cycle, the controller is configured to output a first control signal to the drive circuit to power on the stator winding.

A startup method of an alternating current power tool is provided, where the alternating current power tool includes a brushless motor and a power module configured to receive an alternating current. The method includes starting timing when the alternating current received by the power module crosses through a point of zero; in a preset time interval [T1, T2] of each half cycle, outputting a first control signal to power on a stator winding of the brushless motor; acquiring a rotor position of the brushless motor; and in the preset time interval [T1, T2] of each half cycle, outputting a second control signal to a drive circuit according to the rotor position to make the brushless motor generate a continuous torque, where the starting time of the preset time interval is T1, and the cut-off time of the preset time interval is T2.

BRIEF DESCRIPTION OF DRAWINGS

FIG. 10 is a flowchart of a startup method of the power tool of the example shown in FIG. 5.

DETAILED DESCRIPTION

Figure 1:
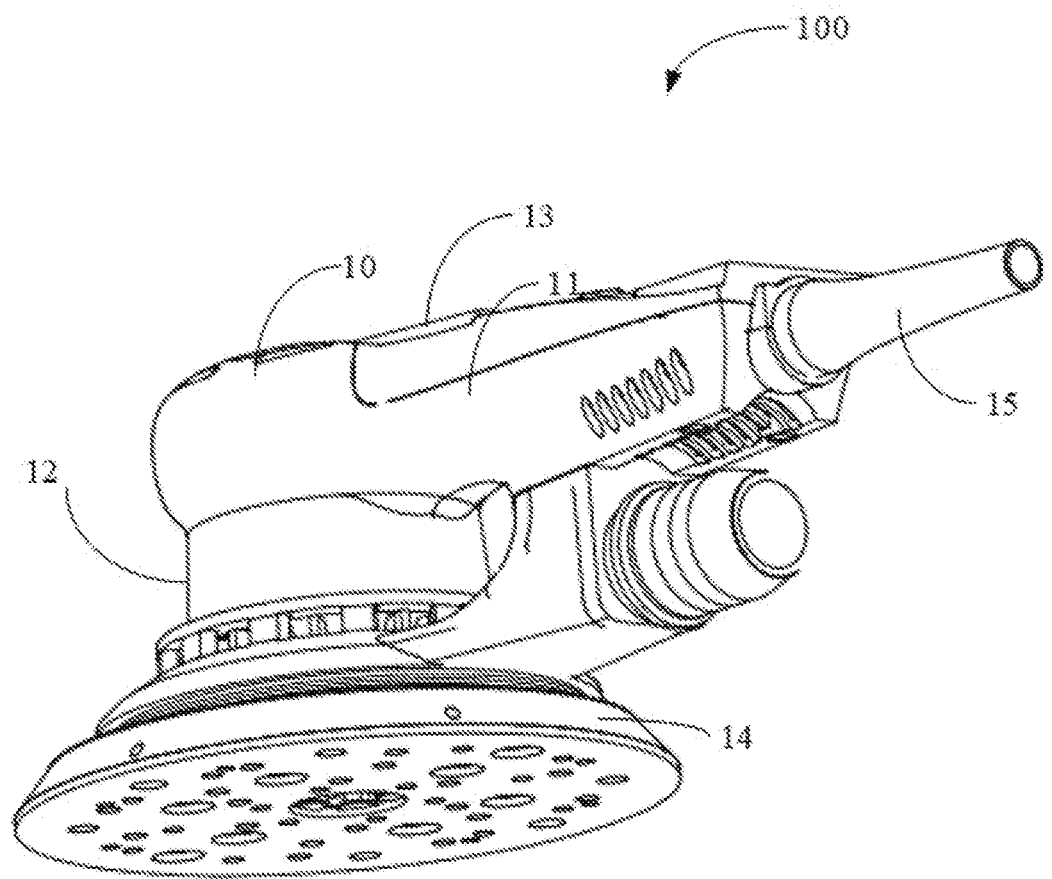
FIG. 1 is a view illustrating the structure of a power tool according to an example.

Referring to FIG. 1, a sander 100 includes a tool housing 10, an accommodating portion 12, a handle portion 11, a switch 13, a baseplate 14, and a power cord 15.

The tool housing 10 is configured to form a housing of the entire sander 100, and an accommodation space for accommodating a motor is formed inside the housing. The motor is configured to convert electrical energy into a force that can be transmitted to the baseplate 14. The baseplate 14 is located outside the tool housing 10, and the baseplate 14 can mount or hold attachments such as sandpaper. The handle portion 11 is provided for users to hold, and the accommodating portion 12 forms an accommodating chamber for accommodating the motor and a fan. The handle portion 11 is also connected to the switch 13 configured to start up the motor. The power cord 15 is configured to connect an alternating current power to supply power to the motor.

Although this example relates to the sander, it is to be understood that the present application is not limited to the disclosed example but can be applied to other types of power tools, including, but not limited to, angle grinders, electric drills, electric wrenches and power saws.

Figure 2:
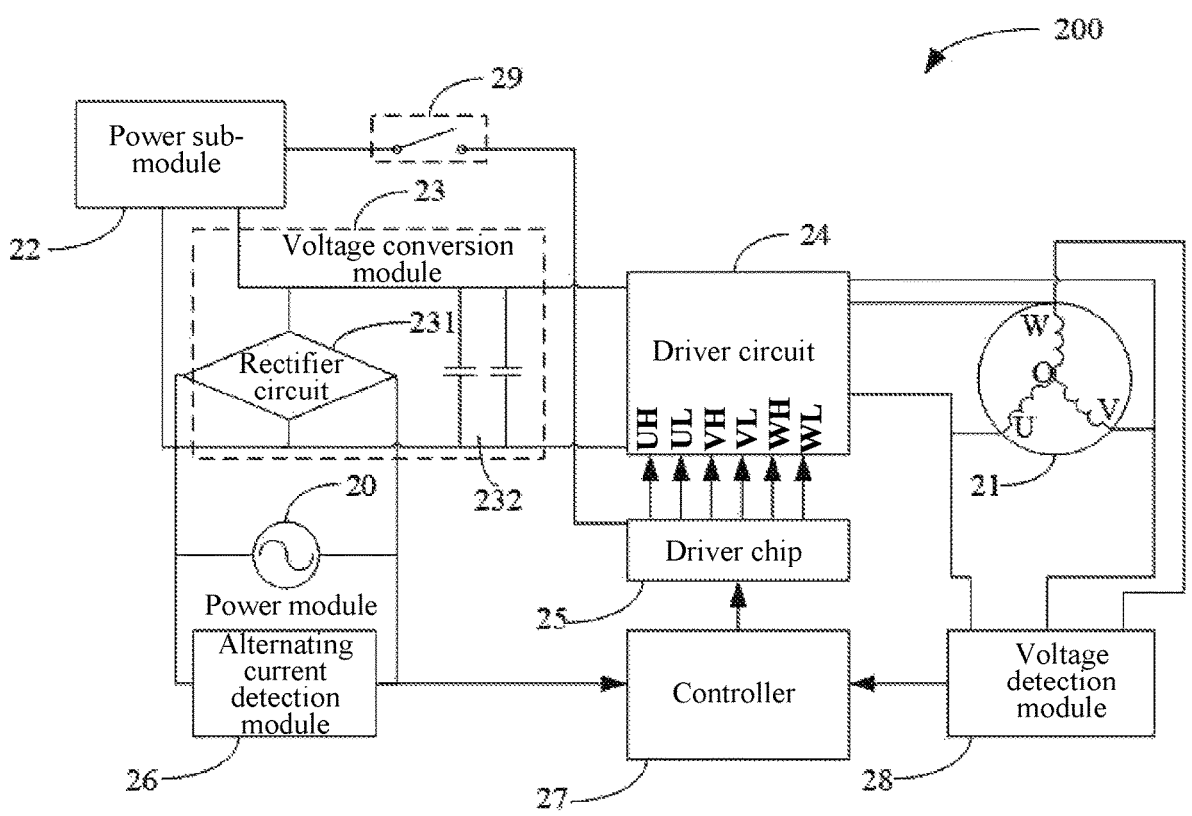
FIG. 2 is a circuit block diagram of a motor driving system of a power tool according to an example.

FIG. 2 shows a control system block diagram of a power tool as one of examples. Reference to FIG. 2, a power tool 200 further includes a power module 20, a brushless motor 21, a power sub-module 22, a voltage conversion module 23, a drive circuit 24, a driver chip 25, an alternating current detection module 26, a controller 27, and a voltage detection module 28.

The power module 20 is configured to receive an alternating current to supply power to the brushless motor 21. In some examples, the power module 20 includes an alternating current plug and a peripheral circuit electrically connected to the alternating current plug. The alternating current plug is plugged into an alternating current socket to receive alternating current mains, thereby providing a source of electrical energy for the brushless motor 21. In another example, the power module 20 includes structures in other forms and peripheral circuits capable of receiving an alternating current, for example, an alternating current plug is received to a portable substation to receive an alternating current, and the like. It is to be noted that the power module 20 merely needs to be able to receive an alternating current, and the structure and form of the power module 20 are not limited herein. The value range of the alternating current that the power module 20 can receive may be 110V to 130V or 210V to 230V.

The brushless motor 21 includes a stator winding and a rotor. In some examples, the brushless motor 21 is a three-phase brushless motor. The three-phase brushless motor includes a rotor having a permanent magnet and three-phase stator windings U, V and W commutated electronically. In some examples, star connection is adopted between the three-phase stator windings U, V and W (as shown in FIG. 2), and in other examples, corner connection is adopted between the three-phase stator windings U, V and W. However, it has to be understood that other types of brushless motors are also within the scope of the present application. The brushless motor may include less than or more than three phases.

The voltage conversion module 23 is configured to receive the alternating current received by the power module 20 and operatively output a direct current bus voltage. The voltage conversion module 23 includes a rectifier circuit 231 and a filter capacitor 232.

The rectifier circuit 231 is configured to convert the alternating current into a direct current and output the direct current. The rectifier circuit 231 is in series connection between the power module 20 and the filter capacitor 232 and is configured to receive and convert the alternating current into a pulsating direct current. In some examples, the rectifier circuit 231 includes four rectifier bridges.

The filter capacitor 232 is configured to filter the pulsating direct current from the rectifier circuit 231. The filter capacitor 232 is in series connection between the rectifier circuit 231 and the drive circuit 24. In some examples, the filter capacitor 232 is a small electrolytic capacitor. In other examples, the filter capacitor 232 is a thin film capacitor. The value range of the capacitance value C of the filter capacitor is $1.46Y$ uF$\leq$C$\leq$6Y uF. Y denotes the rated current of the alternating current power tool, and the unit of Y is A. The thin film capacitor is small in size and not easily damaged by heating, so the overall assembly of the power tool is much improved and the service life of the power tool is ensured.

The power sub-module 22 is configured to supply power to at least one of the driver chip 25 and the controller 27. In some examples, the power sub-module 22 is connected to the power module 20 to convert the alternating current received by the power module 20 into a supply voltage adapted to the at least one of the driver chip 25 and the controller 27 to output. For example, in some examples, to supply power to the driver chip 25, the power sub-module 22 reduces the alternating current power voltage from the power module 20 to 15V to supply power to the controller 27 and reduces the power voltage to 3.2V to supply power to the driver chip 25. In another example, the power sub-module 22 is connected to the voltage conversion module 23 to convert the alternating current received by the power module 20 into a supply voltage adapted to the at least one of the driver chip 25 and the controller 27 to output.

A switch device 29 is configured to start up or stop the motor. The switch device 29 is located between the power sub-module 22 and the driver chip 25. In some examples, the switch device 29 is used as a trigger switch of the power tool and may be disposed in the position shown in FIG. 1. Users press the trigger switch device 29 to make the switch device 29 in the on position, and the at least one of the driver chip 25 and the controller 27 receives an electrical signal from the power sub-module 22 to power on the motor. Moreover, users press the trigger switch device 29 to make the switch device 29 in the cut-off position to cut off the electrical connection between the at least one of the driver chip 25 and the controller 27 and the power sub-module 22 to cut off the motor.

The driver chip 25 is configured to control an on or off state of an electronic switch in the drive circuit 24. The driver chip 25 is in series connection between the controller 27 and the drive circuit 24 and, according to a control signal from the controller 27, controls the on or off state of the electronic switch in the drive circuit 24. In some examples, the control signal from the controller 27 is a pulse-width modulation (PWM) control signal. In this example, the driver chip 25 is separated from the controller 27. In other examples, the driver chip 25 and the controller 27 may be integrated into one unit.

Figure 3:
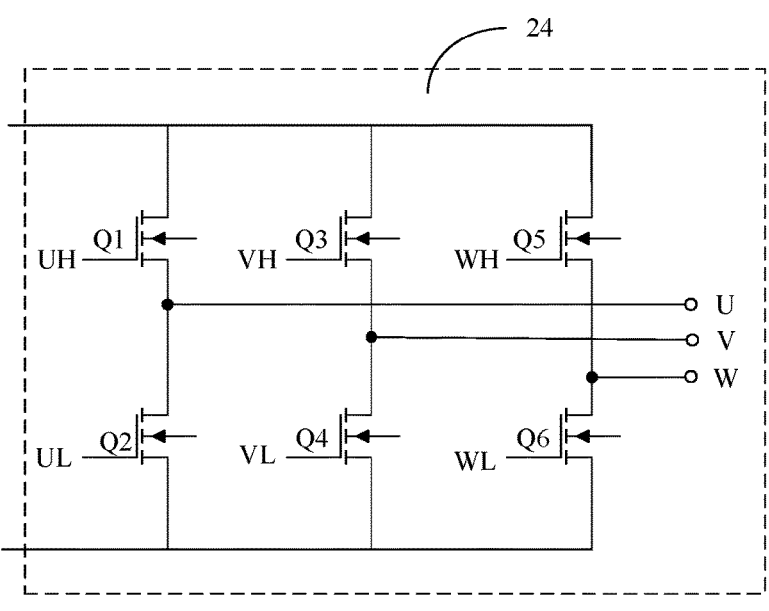
FIG. 3 is a circuit diagram of a drive circuit of a power tool.

The drive circuit 24 is configured to drive the brushless motor 21 and is electrically connected to the voltage conversion module 23. An input terminal of the drive circuit 24 receives a pulsating direct-current voltage from the voltage conversion module 23 and is driven by the driver signal output from the driver chip 25 to distribute power of the pulsating direct-current voltage to each phase winding on the stator of the motor in a certain logical relationship so that the motor is started up and generates a continuous torque. In some examples, the drive circuit 24 includes a plurality of electronic switches. In some examples, the electronic switch includes a field effect transistor (FET), and in other examples, the electronic switch includes an insulated gate bipolar transistor (IGBT) or the like. Referring to FIG. 3, in some examples, the drive circuit 24 is a three-phase bridge circuit. The drive circuit 24 includes three driver switches Q1, Q3 and Q5 provided as high-side switches and three driver switches Q2, Q4 and Q6 provided as low-side switches.

Three driver switches Q1, Q3 and Q5 as high-side switches are disposed between the power line and coils for all phases of the motor, respectively. Three switch components Q2, Q4 and Q6 as low-side switches are disposed between coils for all phases of the motor and the ground wire, respectively.

Each gate terminal UH, UL, VH, VL, WH and WL of the six driver switches Q1 to Q6 is electrically connected to the controller 27, and each drain or source of the six driver switches is connected to the stator winding of the motor. The driver switches Q1 to Q6 switch on and off at a certain frequency according to the control signal output from the controller 27, thereby changing the power state of the power module 20 loaded on the winding of the brushless motor 21.

The drive circuit 24 is a circuit for rotationally driving the motor by switching the energized state of each phase winding of the motor and controlling the energized current of each phase winding. The turn-on sequence and time of each phase winding depends on the position of the rotor. To make the brushless motor 21 rotate, the drive circuit 24 has a plurality of driving states. Under a driving state, the stator winding of the motor can generate a magnetic field, and the controller 27 outputs a control signal based on different rotor positions to control the drive circuit 24 to switch the driving states. Therefore, the magnetic field generated by the stator winding is rotated to drive the rotor to rotate, thereby achieving the driving of the brushless motor 21.

Figure 7:
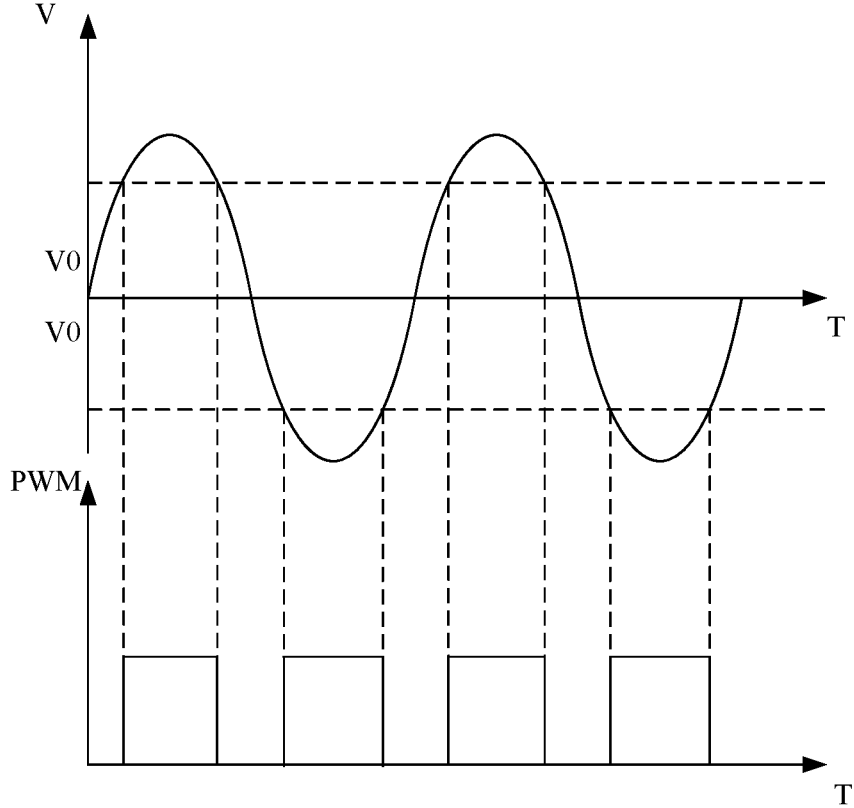
FIG. 7 is a graph illustrating a correspondence between a pulse-width modulation (PWM) signal and an alternating-current voltage of the example shown in FIG. 2.

The alternating current detection module 26 is configured to detect an alternating current voltage received by the power module 20. FIG. 7 shows a waveform diagram of an alternating-current voltage detected by the alternating current detection module 26. The horizontal ordinate indicates time, and the vertical ordinate indicates the alternating-current voltage. The unit of voltage is V. In some examples, the alternating current detection module 26 is a voltage sensor. In other examples, the alternating current detection module 26 is a voltage detection circuit including a resistor.

The voltage detection module 28 is configured to detect the phase voltage of the brushless motor 21. In some examples, the voltage detection module 28 is a voltage sensor. In other examples, the voltage detection module 28 includes a voltage detection circuit of a voltage divider resistor.

The controller 27 is configured to receive an alternating current from the alternating current detection module 26 and a phase voltage from the voltage detection module 28. In some examples, the controller 27 is configured to receive an alternating current from the alternating current detection module 26, where the alternating current is a voltage signal that changes in a certain period.

In a case where an instantaneous voltage value of the alternating current is greater than or equal to a preset voltage value V0 of the alternating current in each half cycle, the controller 27 outputs a first control signal to the drive circuit 24 to power on the stator winding to start up the motor. At this time, the current flows through the stator winding, causing the stator winding to generate a stator magnetic field. The interaction between the stator magnetic field and the rotor makes the motor start to rotate.

In some examples, the controller is configured to acquire the position of the rotor and, in a case where the instantaneous voltage value of the alternating current is greater than or equal to the preset voltage value V0 of the alternating current in each half cycle, outputs a second control signal to the drive circuit 34 according to the rotor position to make the motor generate a continuous torque, and then the motor is started up and works normally. The startup process of the preceding motor is described in detail below with reference to the drawings.

Figure 4:
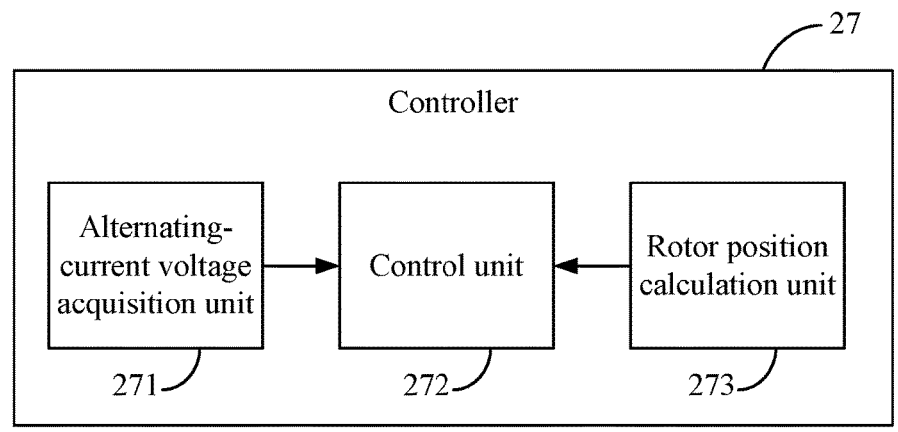
FIG. 4 is a circuit block diagram of a controller of the example shown in FIG. 2.

As shown in FIG. 4, the controller 27 also includes an alternating-current voltage acquisition unit 271, a control unit 272, and a rotor position calculation unit 273.

The alternating-current voltage acquisition unit 271 is configured to receive the alternating current from the alternating current detection module 26, where a voltage waveform of the alternating current is a voltage having a periodic fluctuation of a certain period (as shown in FIG. 7).

The rotor position calculation unit 273 is configured to acquire the rotor position of the brushless motor 21 and send the rotor position of the brushless motor 21 to the control unit 272.

In some examples, the voltage detection module 28 is configured to detect the phase voltage of the brushless motor 21. The power tool further includes a current detection module configured to detect a current loaded on the stator winding. The rotor position calculation unit 273 is configured to calculate the rotor position of the brushless motor 21 according to at least the phase voltage of the brushless motor 21 and the current of the stator winding. For example, the inductance value of the stator winding is calculated according to the phase voltage of the brushless motor 21 and the current of the stator winding to establish a one-to-one matching relationship between the inductance value and the rotor position (in a table lookup method or a formula modeling or the like), thereby acquiring the rotor position.

In other examples, other parameters related to the rotor position may be acquired to acquire the rotor position.

The control unit 272 is configured to receive the supply voltage, where the supply voltage is from the power sub-module 22.

In a case where the instantaneous voltage value of the alternating current is greater than or equal to the preset voltage value V0 of the alternating current in each half cycle, the first control signal is output to the drive circuit 24 to power on the stator winding. In some examples, the first control signal is a first PWM signal, and in a case where the instantaneous voltage value of the alternating current is greater than or equal to the preset voltage value V0 of the alternating current in each half cycle, the control unit 272 outputs the first PWM signal to the drive circuit 24 to turn on one of the high-side switches and one of the low-side switches so that a current is loaded on the stator winding. The stator winding is powered on to generate a magnetic field and then the rotor is driven to rotate.

In a case where the instantaneous voltage value of the alternating current is greater than or equal to the preset voltage value V0 of the alternating current in each half cycle, a second control signal is output to the drive circuit 24 according to the rotor position acquired by the rotor position calculation unit 273 to make the motor generate a continuous torque. In some examples, the second control signal is a second PWM signal. The second PWM signal is related to the rotor position. In a case where the instantaneous voltage value of the alternating current is greater than or equal to the preset voltage value V0 of the alternating current in each half cycle, the second PWM signal is output according to different rotor positions to switch different turn-on sequences and time of high-side switches or low-side switches, thereby causing the alternating current to be distributed at a certain power on the motor winding, thereby causing the motor to generate a continuous torque. The power tool works normally under the continuous torque.

It is to be noted that in a case where the voltage value of the instantaneous voltage is less than the preset voltage value in half cycle, the control unit 272 does not output a control signal to the drive circuit 24.

In this manner, in the case where the instantaneous voltage value of the alternating-current voltage is greater than or equal to the preset voltage value of the alternating-current voltage in each half cycle, the influence of the decrease of the phase voltage due to the discharge of the filter capacitor can be reduced, and thus the phase voltage acquired by the voltage detection module 28 has a higher sampling accuracy, and further, the rotor position calculated according to the phase voltage is more accurate, thereby reducing the probability of motor startup failure due to the incorrect calculation of the rotor position.

The value range of the preset voltage V0 is 60% Vm≤V0≤Vm, where Vm is the maximum voltage amplitude of the acquired instantaneous voltage. If the preset voltage V0 is less than 60% Vm, the probability of startup failure is greatly increased.

In some examples, the value range of V0 is 70% Vm≤V0≤Vm. In other examples, the value range of V0 is 80% Vm≤V0≤Vm, or the value range of V0 is 90% Vm≤V0≤Vm.

Reference is made to the graph in FIG. 7 illustrating a correspondence between the PWM signal and the alternating-current voltage. In each half cycle, in a case where the instantaneous voltage value of the alternating-current voltage is greater than or equal to the preset voltage V0 of the alternating-current voltage, the controller 27 outputs a PWM signal to the drive circuit 24 to start up the motor; and in a case where the instantaneous voltage value of the alternating-current voltage is less than the preset voltage V0, the controller 27 does not output the PWM signal. It is to be understood that in each half cycle, in a case where the rotor is in a rotor position and the instantaneous voltage V0 of the alternating-current voltage is in the range of 60% Vm≤V0≤Vm as shown in FIG. 7, the controller 27 outputs a PWM signal to the drive circuit 24 to start up the motor, and in a case where the instantaneous voltage V0 of the alternating-current voltage is not in the range of 60% Vm≤V0≤Vm, the controller 27 does not output a PWM signal to the drive circuit 24 to start up the motor. In the next half cycle, the controller 27 still performs this operation when the rotor is in an another rotor position.

Figure 8:
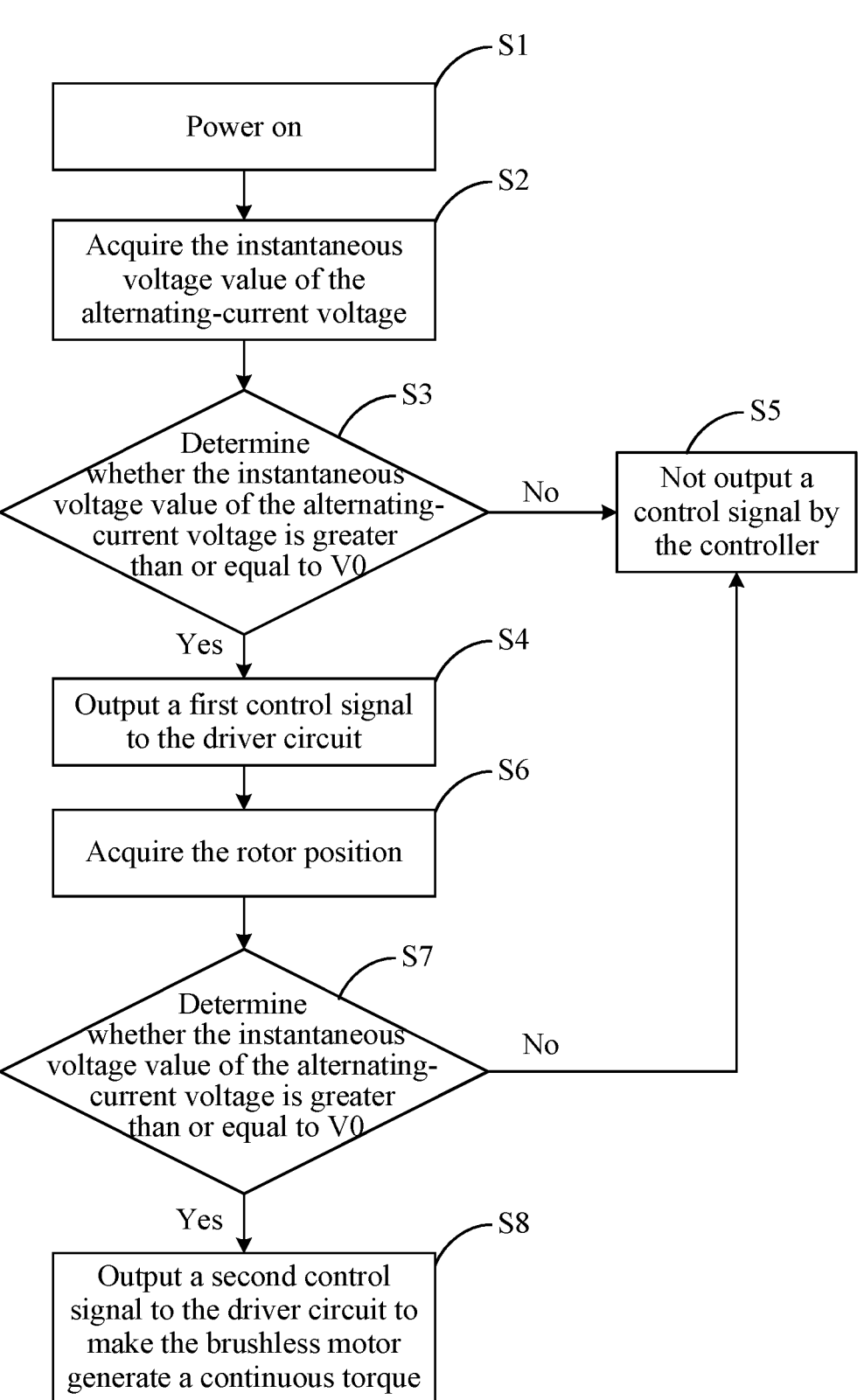
FIG. 8 is a flowchart of a startup method of the power tool of the example shown in FIG. 2.

Referring to FIG. 8, a startup method of an alternating current power tool as described above includes steps S1 to S8.

In step S1, power is loaded.

In this step, users press the switch device 29 to make the power tool receive an alternating current.

In step S2, the instantaneous voltage value of the alternating-current voltage is acquired.

In this step, the alternating-current voltage received by the power module 20 may be detected by the alternating current detection module 26 to acquire an alternating-current voltage waveform. The controller 27 is configured to receive the alternating-current voltage detected by the alternating current detection module 26. The alternating-current voltage acquisition unit 271 in the controller 27 is configured to receive the alternating-current voltage of the alternating current detection module 26 to acquire the instantaneous voltage value of the alternating-current voltage at each time.

In step S3, it is determined whether the instantaneous voltage value of the alternating-current voltage is greater than or equal to the preset voltage value V0 in each half cycle. Based on the determination result that the instantaneous voltage value of the alternating-current voltage is greater than or equal to the preset voltage value V0 in each half cycle, the process proceeds to step S4. Based on the determination result that the instantaneous voltage value of the alternating-current voltage is less than the preset voltage value V0 in each half cycle, the process proceeds to step S5.

In step S4, a first control signal is output to the drive circuit 24 to power on the stator winding of the brushless motor 21.

In step S5, a control signal is not output to the drive circuit 24.

In step S6, the rotor position is acquired.

As one type of example, step S6 includes sub-step S61 and sub-step S62.

In sub-step S61, the phase voltage of the brushless motor 21 is detected, for example, the phase voltage of the brushless motor 21 is detected by the voltage detection module 28. Exemplarily, three phase voltages of a three-phase brushless motor 21 are collected respectively.

In sub-step S62, the rotor position of the brushless motor 21 is acquired according to the detected phase voltage and the detected current of the stator winding. In some examples, in the controller 27, the inductance value of the stator winding is calculated according to the phase voltage and the current of the stator winding, a functional relationship model of the inductance value and the rotor position of the brushless motor 21 is established, and the rotor position of the brushless motor 21 is calculated according to the detected phase voltage and the current of the stator winding. In other examples, in the controller 27, the inductance value of the stator winding is calculated according to the phase voltage and the current of the stator winding, a table of a one-to-one correspondence between the inductance value and the rotor position of the brushless motor 21 is established, and the rotor position of the brushless motor 21 is acquired according to the table lookup method.

In step S7, it is determined whether the instantaneous voltage value of the alternating current is greater than or equal to the preset voltage value V0 in each half cycle. Based on the determination result that the instantaneous voltage value of the alternating current is greater than or equal to the preset voltage value V0 in each half cycle, the process proceeds to step S8. Based on the determination result that the instantaneous voltage value of the alternating current is less than the preset voltage value V0 in each half cycle, the process proceeds to step S5.

In step S8, a second control signal is output to the drive circuit 24 according to the rotor position to make the brushless motor 21 generate a continuous torque.

Figure 5:
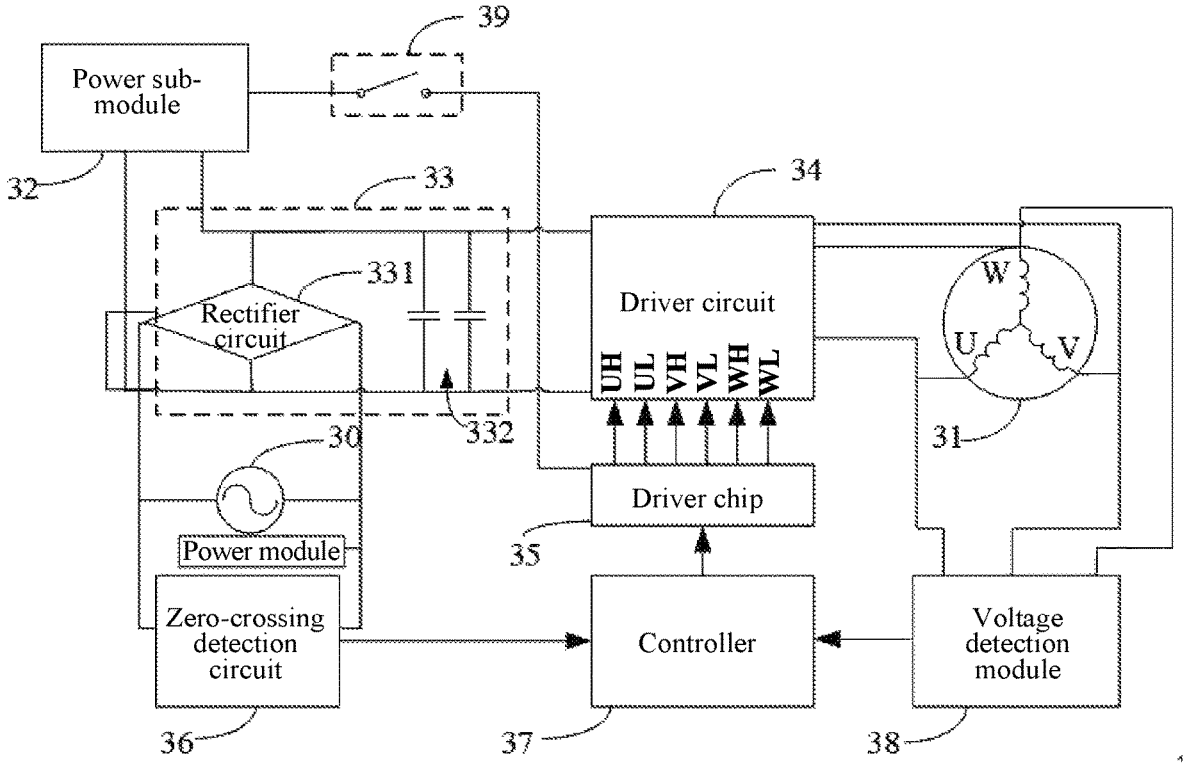
FIG. 5 is a circuit block diagram of a motor driving system of a power tool according to another example.

FIG. 5 illustrates another example of a motor driving system that may be used by a power tool. Unlike the example shown in FIG. 2, the power tool includes a zero-crossing detection circuit 36.

The zero-crossing detection circuit 36 is configured to receive the alternating current received by the power module 30 and outputs a zero-crossing signal to the controller 37 when the alternating-current voltage crosses through the point of zero.

The controller 37 is configured to receive a zero-crossing signal from the zero-crossing detection circuit 36 and a phase voltage from the voltage detection module 38. In some examples, the controller is configured to receive a zero-crossing signal from a zero-crossing detection circuit. The zero-crossing signal triggers timing, and in a preset time interval [T1, T2], a first control signal is output to the drive circuit 34 to power on the stator winding to start up the motor. At this time, the current flows through the stator winding, causing the stator winding to generate a stator magnetic field. The interaction between the stator magnetic field and the rotor makes the motor start to rotate.

Figure 6:
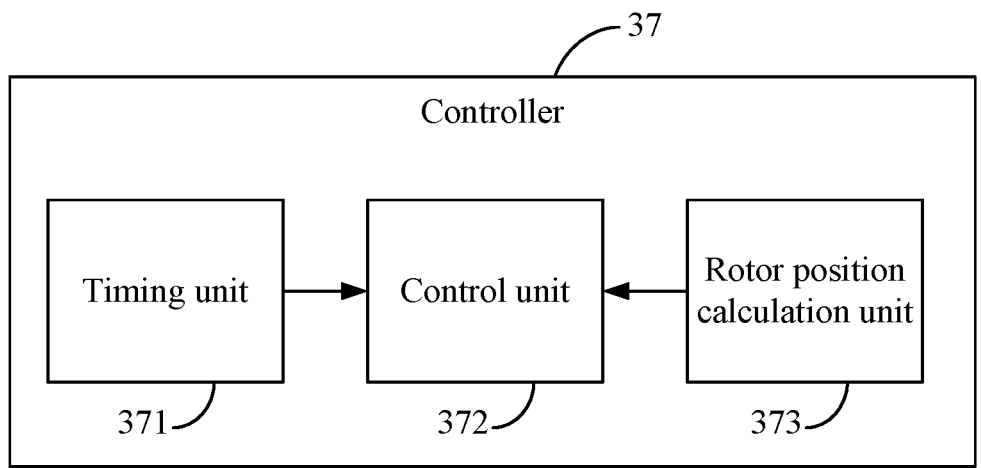
FIG. 6 is a circuit block diagram of a controller of the example shown in FIG. 5.

In some examples, the controller is further configured to acquire the rotor position and, in a preset time [T1, T2], output a second control signal to the drive circuit 34 according to the rotor position to make the motor generate a continuous torque and thereby make the motor to start up to complete normal work. The startup process of the preceding motor is described in detail below with reference to the drawings. As shown in FIG. 6, the controller 37 also includes a timing unit 371, a control unit 372, and a rotor position calculation unit 373.

The timing unit 371 receives the zero-crossing signal of the zero-crossing detection circuit 36, and then the zero-crossing signal triggers the timing unit 371 to start timing. The rotor position calculation unit 373 is configured to acquire the rotor position of a brushless motor 31 and send the rotor position of the brushless motor 31 to the control unit 372.

The control unit 372 is configured to receive the supply voltage. The supply voltage is from a power sub-module 32.

In a preset time [T1, T2], a first control signal is output to the drive circuit 34 to power on the stator winding. In some examples, the first control signal is a first PWM signal, and in a preset time [T1, T2], the control unit 372 outputs the first PWM signal to the drive circuit 34 to turn on one of the high-side switches and one of the low-side switches so that a current is loaded on the stator winding. The stator winding is powered on to generate a magnetic field and then the rotor is driven to rotate.

In the preset time [T1, T2], a second control signal is output to the drive circuit 34 according to the rotor position acquired by the rotor position calculation unit 373 to make the motor generate a continuous torque. In some examples, the second control signal is a second PWM signal. The second PWM signal is related to the rotor position. In the preset time [T1, T2], the second PWM signal is output according to different rotor positions to switch different turn-on sequences and time of high-side switches or low-side switches, thereby causing the alternating current to be distributed at a certain power on the motor winding, thereby causing the motor to generate a continuous torque. The power tool works normally under the continuous torque.

It is to be noted that in a case where the timing time is not in the preset time [T1, T2], the control unit 372 does not output a control signal to the drive circuit 34.

In this manner, in the timing time [T1, T2], the influence of the decrease of the phase voltage due to the discharge of the filter capacitor can be reduced, and thus the phase voltage acquired by the voltage detection module 38 has a higher sampling accuracy, and further, the rotor position calculated according to the phase voltage is more accurate, thereby reducing the probability of motor startup failure due to the incorrect calculation of the rotor position.

The value range of the starting time T1 and the value range of the cut-off time T2 are 2.5 ms≤T1≤T2≤7 ms. In some examples, the value range of the starting time T1 and the value range of the cut-off time T2 are 3 ms≤T1≤T2≤7 ms. In other examples, the value range of the starting time T1 and the value range of the cut-off time T2 are 4 ms≤T1≤T2≤6 ms. The starting time T1<3 ms and the cut-off time T2>6 ms greatly increase the probability of startup failure. In other examples, the value range of the starting time T1 and the value range of the cut-off time T2 are 2.5 ms≤T1≤T2≤5.8 ms. In other examples, the value range of the starting time T1 and the value range of the cut-off time T2 are 3.3 ms≤T1≤T2≤5.0 ms.

Figures 9, 9A, 9B, 9C:
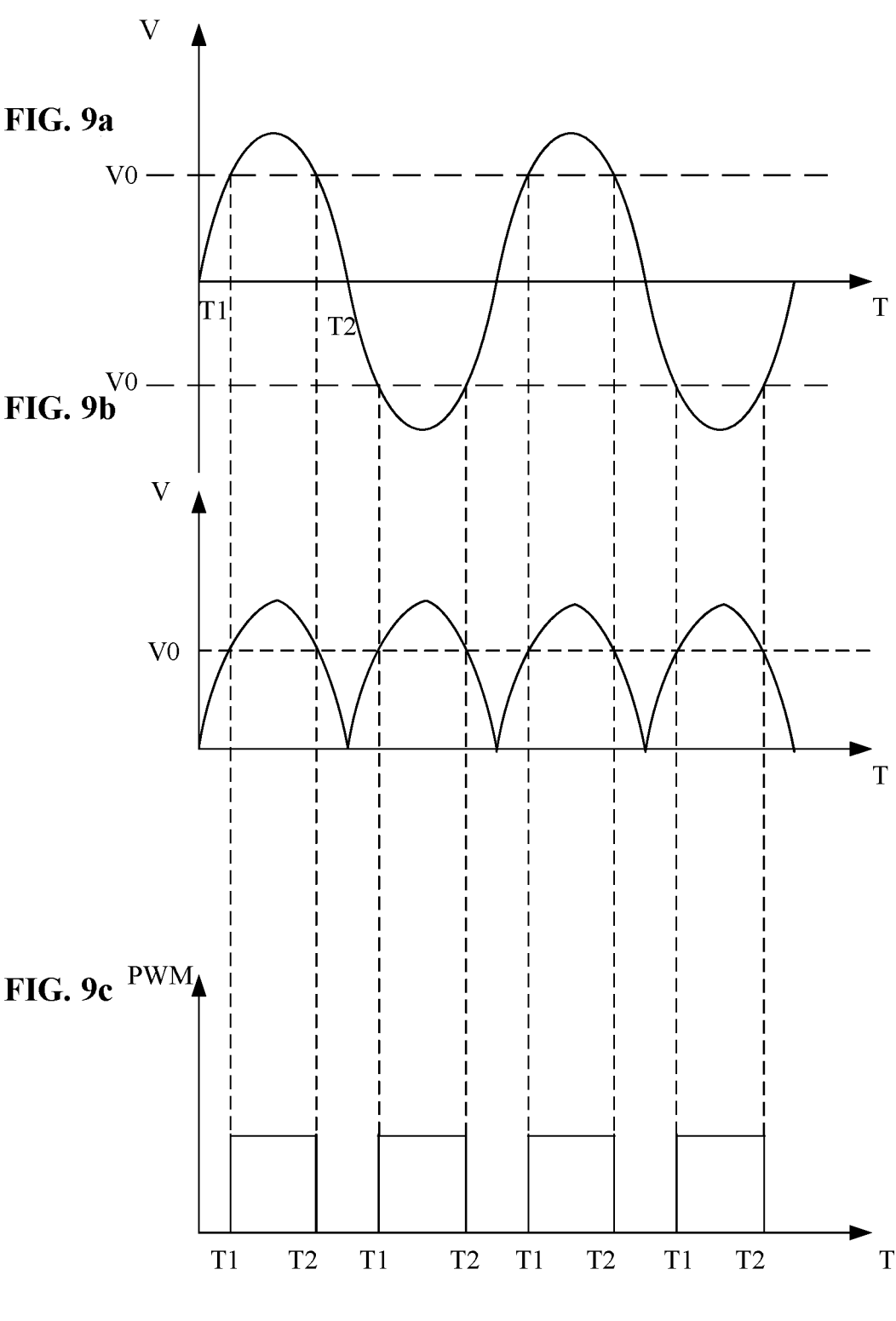
FIG. 9A is a waveform diagram of an alternating-current voltage supplied by a power module.
FIG. 9B is a waveform diagram of a pulsating direct-current voltage processed by a filter capacitor.
FIG. 9C is a corresponding PWM signal diagram.

Referring to FIG. 9, FIG. 9A is a waveform diagram of an alternating-current voltage supplied by the power module 30. The horizontal ordinate indicates time, and the vertical ordinate indicates the alternating-current voltage. The unit of voltage is V. FIG. 9B is a waveform diagram of a pulsating direct-current voltage processed by a filter capacitor 332. FIG. 9c shows that in the timing time [T1, T2], the controller 37 outputs a PWM signal to the drive circuit 34 to start up the motor. In the case where the timing time is not in the timing time [T1, T2], the PWM signal is not output to the drive circuit 34.

Referring to FIG. 10, a startup method of an alternating current power tool as described above includes steps S1' to S9'.

In step S1', power is loaded.

In this step, users press a switch device 39 to make the power tool receive an alternating current.

In step S2', an alternating current zero-crossing signal is acquired.

In this step, the zero-crossing detection circuit 36 may be used to receive the alternating current received by the power module 30 and, when the alternating current crosses through a point of zero, output a zero-crossing signal to the controller 37. The controller 37 is configured to receive the zero-crossing signal from the zero-crossing detection circuit 36.

In step S3', timing is started.

In this step, the controller 37 may be used to receive the zero-crossing signal from the zero-crossing detection circuit 36 and trigger the timing in response to the zero-crossing signal. The timing unit 371 in the controller 37 receives the zero-crossing signal from the zero-crossing detection circuit 36, and then the zero-crossing signal triggers the timing unit 371 to start timing.

In step S4', it is determined whether the timing signal is in the preset time [T1, T2]. Based on the determination result that the timing signal is in the preset time [T1, T2], step S5' is performed. Based on the determination result that the timing signal is not in the preset time [T1, T2], step S6' is performed.

In step S5', a first control signal is output to the drive circuit 34 to power on the stator winding of the brushless motor 31.

In step S6', a control signal is not output to the drive circuit 34.

In step S7', the rotor position is acquired.

As one type of example, step S7' includes sub-step S71 and step S72.

In S71, the phase voltage of the brushless motor 31 is detected, for example, the phase voltage of the brushless motor 31 is detected by the voltage detection module 38. Exemplarily, three phase voltages of the three-phase brushless motor 31 are collected.

In S72, the rotor position of the brushless motor 31 is acquired according to the detected phase voltage and the detected current of the stator winding. In some examples, in the controller 27, the inductance value of the stator winding is calculated according to the phase voltage and the current of the stator winding, a functional relationship model of the inductance value and the rotor position of the brushless motor 21 is established, and the rotor position of the brushless motor 21 is calculated according to the detected phase voltage and the current of the stator winding. In other examples, in the controller 27, the inductance value of the stator winding is calculated according to the phase voltage and the current of the stator winding, a table of a one-to-one correspondence between the inductance value and the rotor position of the brushless motor 21 is established, and the rotor position of the brushless motor 21 is acquired according to the table lookup method.

In step S8', it is determined whether the timing signal is in the preset time [T1, T2]. Based on the determination result that the timing signal is in the preset time [T1, T2], step S9' is performed. Based on the determination result that the timing signal is not in the preset time [T1, T2], step S6' is performed.

In step S9', a second control signal is output to the drive circuit 34 according to the rotor position to make the brushless motor 31 generate a continuous torque.

The power tool and the startup method of the power tool disclosed in the present application can effectively reduce the probability of startup failure of the power tool.

11

12

What is claimed is:

1. An alternating current power tool, comprising a brushless motor, a power module, a voltage conversion module, a drive circuit, and a controller, wherein the brushless motor comprises a stator winding and a rotor;

the power module is configured to receive an alternating current to supply power to the stator winding;

the voltage conversion module is configured to receive the alternating current received by the power module and operatively output a direct current bus voltage;

the drive circuit is electrically connected to the voltage conversion module and configured to drive the brushless motor; and the controller is configured to start timing when the alternating current received by the power module crosses through a point of zero and, in a preset time interval [T1, T2] of each half cycle, and when an instantaneous voltage value of the alternating current is greater than or equal to a preset voltage value of the alternating current in each half cycle, the controller outputs a first control signal, comprising a single pulse, to the drive circuit to power on the stator winding to start up the motor from a non-moving state where relative movement between the stator winding and the rotor is substantially zero, and wherein a starting time of the preset time interval is T1 and a cut-off time of the preset time interval is T2.

2. The alternating current power tool of claim 1, wherein the controller is further configured to:

acquire a rotor position of the brushless motor and, in the preset time interval [T1, T2], output a second control signal to the drive circuit according to the rotor position to make the brushless motor generate a continuous torque.

3. The alternating current power tool of claim 2, wherein the controller comprises a rotor position calculation unit configured to acquire the rotor position of the brushless motor.

4. The alternating current power tool of claim 1, wherein the alternating current power tool is a sander.

5. The alternating current power tool of claim 1, further comprising:

a zero-crossing detection circuit configured to receive the alternating current received by the power module and output a zero-crossing signal when the alternating current crosses through the point of zero;

wherein the controller is configured to receive the zero-crossing signal.

6. The alternating current power tool of claim 5, wherein the controller comprises a timing unit configured to receive the zero-crossing signal and the timing unit starts timing when the timing unit receives the zero-crossing signal.

7. The alternating current power tool of claim 1, wherein a value range of the starting time T1 is 2.5 ms≤T1≤T2 and a value range of the cut-off time T2 is T1≤T2≤7 ms.

8. The alternating current power tool of claim 1, wherein the voltage conversion module comprises a rectifier circuit and a filter capacitor, the rectifier circuit is configured to convert the alternating current received by the power module into a direct current and output the direct current, the filter capacitor is connected to the rectifier circuit and configured to filter the direct current output from the rectifier circuit, a value range of a capacitance value C of the filter capacitor is 1.46Y uF≤C≤6Y uF, and Y denotes a rated current of the alternating current power tool, and an unit of Y is A.

9. The alternating current power tool of claim 8, wherein the filter capacitor is a thin film capacitor.

10. The alternating current power tool of claim 1, wherein, in a remaining time of each half cycle exceeding the preset time interval of each half cycle, the controller makes the drive circuit not start up the brushless motor.

11. An alternating current power tool, comprising a brushless motor, a power module, a voltage conversion module, a drive circuit, and a controller, wherein the brushless motor comprises a stator winding and a rotor;

the power module is configured to receive an alternating current to supply power to the stator winding;

the voltage conversion module is configured to receive the alternating current received by the power module and operatively output a direct current bus voltage;

the drive circuit is electrically connected to the voltage conversion module and configured to drive the brushless motor, wherein when an instantaneous voltage value of the alternating current is greater than or equal to a preset voltage value V0 of the alternating current in each half cycle, the controller is configured to output a first control signal, comprising a single pulse, to the drive circuit to power on the stator winding to start up the motor from a non-moving state where relative movement between the stator winding and the rotor is substantially zero.

12. The alternating current power tool of claim 11, wherein the controller is further configured to:

acquire a rotor position of the brushless motor; and in a case where the instantaneous voltage value of the alternating current is greater than or equal to the preset voltage value V0 of the alternating current in each half cycle, output a second control signal to the drive circuit according to the rotor position to make the brushless motor generate a continuous torque.

13. The alternating current power tool of claim 11, wherein the alternating current power tool is a sander.

14. The alternating current power tool of claim 11, wherein a value range of the preset voltage value V0 is 0.6 Vm≤V0≤Vm and Vm is a maximum voltage amplitude of the alternating current.

15. The alternating current power tool of claim 11, wherein the voltage conversion module comprises a rectifier circuit and a filter capacitor, the rectifier circuit is configured to convert the alternating current received by the power module into a direct current and output the direct current, the filter capacitor is connected to the rectifier circuit and configured to filter the direct current output from the rectifier circuit, and a value range of a capacitance value C of the filter capacitor is 1.46Y uF≤C≤6Y uF, and Y denotes a rated current of the alternating current power tool, and an unit of Y is A.

16. The alternating current power tool of claim 15, wherein the filter capacitor is a thin film capacitor.

17. A startup method of an alternating current power tool, the alternating current power tool comprising a brushless motor and a power module configured to receive an alternating current, and the method comprising:

starting timing when the alternating current received by the power module crosses through a point of zero;

in a preset time interval [T1, T2] of each half cycle, outputting a first control signal, comprising a single pulse, to power on a stator winding of the brushless motor to start up the motor;

acquiring a rotor position of the brushless motor; and in the preset time interval [T1, T2] of each half cycle, outputting a second control signal to a drive circuit according to the rotor position to make the brushless motor generate a continuous torque by starting movement of the brushless motor from a non-moving state where movement of the brushless motor is substantially zero, and wherein a starting time of the preset time interval is T1 and a cut-off time of the preset time interval is T2.

18. The startup method of claim 17, further comprising:

in a remaining time of each half cycle exceeding the preset time interval of each half cycle, making the drive circuit not start up the brushless motor.

19. The startup method of claim 17, wherein a value range of the starting time T1 is 2.5 ms≤T1≤T2 and a value range of the cut-off time T2 is T1≤T2≤7 ms.

20. The startup method of claim 17, wherein acquiring the rotor position of the brushless motor comprises:

detecting a phase voltage of the brushless motor;

detecting a current loaded on the stator winding of the brushless motor; and calculating the rotor position of the brushless motor according to at least the phase voltage of the brushless motor and the current of the stator winding.

\* \* \* \* \*